(12) United States Patent
Yamada et al.

(10) Patent No.: US 6,688,602 B2
(45) Date of Patent: Feb. 10, 2004

(54) SHAFT SEALING MECHANISM OF COMPRESSOR WITH MECHANICAL SEAL

(75) Inventors: Takeshi Yamada, Kariya (JP); Takayuki Imai, Kariya (JP); Yoshiaki Takigahira, Sakado (JP)

(73) Assignee: Kabushiki Kaisha Toyota Jidoshokki, Kariya (JP)

(*) Notice: Subject to any disclaimer, the term of this patent is extended or adjusted under 35 U.S.C. 154(b) by 0 days.

(21) Appl. No.: 10/019,844

(22) PCT Filed: May 2, 2001

(86) PCT No.: PCT/JP01/03811

§ 371 (c)(1),
(2), (4) Date: Jan. 2, 2001

(87) PCT Pub. No.: WO01/84025

PCT Pub. Date: Nov. 8, 2001

(65) Prior Publication Data

US 2003/0098547 A1 May 29, 2003

(30) Foreign Application Priority Data

May 2, 2000 (JP) ........................................ 2000-133235

(51) Int. Cl.$^7$ ................................................ F16J 15/34
(52) U.S. Cl. ....................... 277/367; 277/369; 277/359; 277/388; 277/389
(58) Field of Search ................................ 277/367, 369, 277/379, 387, 388, 389, 359

(56) References Cited

U.S. PATENT DOCUMENTS

| | | | |
|---|---|---|---|
| 3,511,510 A | * | 5/1970 | Lindeboom |
| 3,869,135 A | * | 3/1975 | Diederich |
| 4,403,780 A | * | 9/1983 | Potter |
| 4,773,655 A | | 9/1988 | Lummila et al. |
| 5,694,784 A | | 12/1997 | Frey et al. .................. 62/228.5 |
| 6,227,547 B1 | | 5/2001 | Dietle et al. ................ 277/336 |

FOREIGN PATENT DOCUMENTS

| | | |
|---|---|---|
| JP | 60-178661 | 11/1985 |
| JP | 62-37573 A | 2/1987 |
| JP | 62 37665 | 3/1987 |
| JP | 62-171567 A | 7/1987 |
| JP | 2-57765 A | 2/1990 |
| JP | 4-125364 A | 4/1992 |
| JP | 5-40661 | 6/1993 |
| JP | 6-279117 A | 10/1994 |
| JP | 11-294597 A | 10/1999 |
| JP | 11-344126 A | 12/1999 |
| JP | 2001-65706 A | 3/2001 |

* cited by examiner

*Primary Examiner*—Anthony Knight
*Assistant Examiner*—Enoch Peavey
(74) *Attorney, Agent, or Firm*—Woodcock Washburn LLP

(57) ABSTRACT

The mechanical seal (3) includes: a rotary side sliding ring (32) which is supported by the large diameter side outer circumferential face (23) of the annular step section (21) of the rotary shaft (2) via the rotary side O-ring (37) and press-fitted into the annular step section (21) by gas pressure in the device; and an unturnable stationary side sliding ring (31) which is fixed onto the seal housing (1) side via the stationary side O-ring (33) being capable of moving in the axial direction and being able to come into close contact with the sliding protrusion (323) of the rotary side sliding ring (32) due to the spring (36) so that the airtightly sealed sliding face S is formed. The rotary side sliding ring (32) is made of self-lubrication sliding material, and the stationary side sliding ring (31) is made of sliding material, the Young's modulus of which is higher than that of the self-lubrication sliding material. A deforming force given to the rotary side sliding ring (32) in the leaning direction caused by differential pressure between the high gas pressure and the atmospheric pressure outside the device is canceled by a deforming force caused by a component in the axial direction of the differential pressure acting on the annular step section (21) of the rotary shaft (2) in the pressing direction.

3 Claims, 4 Drawing Sheets

SHAFT SEALING MECHANISM OF COMPRESSOR WITH MECHANICAL SEAL

TECHNICAL FIELD

The present invention relates to a technique for shaft-sealing a circumference of a rotary shaft of a compressor of an air-conditioner using a mechanical seal.

BACKGROUND ART

FIG. 6 is a view showing a typical example of a conventional mechanical seal used as a shaft-seal means of a compressor of an air-conditioner for automobile use (a car air-conditioner) in which $CO_2$ gas is used as refrigerant. This type mechanical seal 200 is composed as follows. On the rotary shaft 101 of a gas compressor, the refrigerant of which is $CO_2$ gas, the rotary side sliding ring 201 is arranged via the O-ring 202 in such a manner that the rotary side sliding ring 201 is capable of moving in the axial direction and rotating together with the rotary shaft 101. The stationary side sliding ring 203, which cannot rotate, is airtightly arranged via the O-ring 204 on the seal housing 102 side of the gas compressor, the refrigerant of which is $CO_2$ gas. The rotary side sliding ring 201 is closely contacted with the stationary side sliding ring 203 by a pushing force generated by the spring 205 in the axial direction. When both the rings 201 and 203 are closely contacted with each other, the airtightly sealed sliding face 200S is formed.

In this case, space A in the device, which is located on the right in the drawing and reaches the outer circumference of the airtightly sealed sliding face 200S, is filled with an atmosphere of $CO_2$ gas containing refrigerating machine oil. Space B on the atmosphere side reaches the inner circumference of the airtightly sealed sliding face 200S. The differential pressure $\Delta p$ between space A in the device and space B on the atmosphere side changes in a range from 3 to 13 MPa. The rotary side sliding ring 201 is made of carbon sliding material having a self-lubrication property. The sliding protrusion 201a, which is continuously formed in the circumferential direction, of the rotary side sliding ring 201 is slidably contacted with the stationary side sliding ring 203. The stationary side sliding ring 203 is made of sliding material of ceramics which is harder than the carbon sliding material described above.

According to the conventional mechanical seal 200 described above, the rotary side sliding ring 201 made of carbon sliding material, the Young's modulus of which is low, is deformed into a tapered-shape which is exaggeratedly shown in FIG. 7. The reason why the rotary side sliding ring 201 is deformed into a tapered-shape will be explained as follows. The rotary side sliding ring 201 is given a displacement force as shown by arrow "f" by the differential pressure $\Delta p$ acting in the radial direction on a portion close to the stationary side sliding ring 203 with respect to the O-ring 202 which is arranged on an inner circumference of the rotary side sliding ring 201. Therefore, the portion of the rotary side sliding ring 201 close to the stationary side sliding ring 203 leans against the stationary side sliding ring 203 side. The sliding protrusion 201a, the bending strength of which is low from the viewpoints of profile and structure, further leans against the inner circumferential side by the differential pressure acting in the radial direction.

As a result, for example, in the case where a mechanical seal is used in which the rotary side sliding ring 201 is made of carbon sliding material, the outer diameter of the sliding protrusion 201a is approximately 20 mm and the width of the airtightly sealed sliding face 200S in the radial direction is approximately 2 mm, partial abrasion is caused by sliding in which the quantity of abrasion in the outer circumferential portion of the sliding protrusion 201a is larger than that in the inner circumferential portion of the sliding protrusion 201a by about 1 to 3 fm (femto-meter).

Therefore, when displacement force "f" caused by differential pressure $\Delta p$ is reduced according to the reduction of gas pressure of refrigerant $CO_2$ filled in space A in the device, as shown in FIG. 8, a tapered gap "g", which is open onto the outer circumferential side (refrigerant gas $CO_2$ atmosphere side) is caused due to the above partial abrasion. Accordingly, when differential pressure $\Delta p$ acts on this gap "g", an intensity of force OP to open the airtightly sealed sliding face 200S is increased.

When some refrigerating machine oil, which exists in the refrigerant gas $CO_2$ in a mist form, is introduced onto the airtightly sealed sliding face 200S, an oil film is formed on the airtightly sealed sliding face 200S. The thus formed oil film greatly contributes to the prevention of leakage of refrigerant $CO_2$ gas. When the tapered gap "g", which is open onto the outer circumferential side as described above, is formed, the width of the airtightly sealed sliding face 200S is remarkably decreased, and the oil film existing on the tightly sealed sliding face 200S is remarkably decreased. Therefore, refrigerant $CO_2$ gas tends to leak from the device.

DISCLOSURE OF THE INVENTION

The present invention has been accomplished to solve the above problems. The primary technical task of the present invention is to prevent the collapse of an oil film on the airtightly sealed sliding face and suppress the leakage of refrigerant gas caused by the collapse of the oil film when deformation of the sliding ring and sliding protrusion caused by the pressure in the space in the device is reduced and partial abrasion on the airtightly sealed sliding face, which is caused by the deformation, is reduced.

The above technical task can be effectively accomplished by the present invention.

The present invention provides a shaft seal mechanism of a compressor with a mechanical seal, the mechanical seal comprising: a rotary side sliding ring supported by an outer circumferential face on a large diameter side of an annular step section formed on a rotary shaft of a compressor via a rotary side packing, the rotary side sliding ring being press-fit into the annular step section by gas pressure in the compressor; and a stationary side sliding ring, which is not rotated, airtightly fixed onto a seal housing side of the compressor via a stationary side packing in such a manner that the stationary side sliding ring can be moved in the axial direction, the stationary side sliding ring airtightly coming into contact with the rotary side sliding ring by a pushing force of a spring in the axial direction so as to form an airtightly sealed sliding face, wherein a space in the compressor in which gas to be sealed exists reaches an outer circumferential side of the airtightly sealed sliding face, the rotary side sliding ring is made of a self-lubrication sliding material, the stationary side sliding ring is made of a sliding material, the Young's modulus of which is higher that that of the self-lubrication sliding material, and a sliding protrusion extending from the rotary side sliding ring in the circumferential direction slidably comes into contact with the stationary side sliding ring. In this case, the self-lubrication sliding material, which is material of the rotary side sliding ring, is a carbon sliding material, a PTFE sliding material or a polyimide sliding material.

In the above structure, the rotary side sliding ring is given a deforming force in the leaning direction by a differential pressure between high gas pressure in the device and atmospheric pressure outside the device, however, this deforming force is canceled by a deforming force generated by a component force in the axial direction of the differential pressure acting on the annular step section of the rotary shaft in a pushing direction. Therefore, the occurrence of partial abrasion of the airtightly sealed sliding face, which is caused by a deformation of the rotary side sliding ring by leaning, can be suppressed. In this connection, the stationary side sliding ring is also given a deforming force in the leaning direction by the differential pressure in the same manner as that described above. However, since this stationary side sliding ring is made of material, the Young's modulus of which is high, a quantity of deformation is very low, which causes no problems.

A more preferable structure to be added to the present invention is described below. A gap in the axial direction is formed in an outer circumferential section between an annular step section of the rotary shaft and a back face of an inner diameter section of the rotary side sliding ring, which are contacted with each other, being located on the inner diameter side with respect to an airtightly sealed section formed by the rotary side packing. Due to the foregoing, a deforming force, the direction of which is opposite to that of the deformation of the rotary side sliding ring by leaning, is generated. Therefore, the occurrence of partial abrasion on the outer circumferential side of the airtightly sealed sliding face caused by the deformation by leaning can be more positively prevented.

The present will be more easily understood from the following descriptions of embodiments with reference to the accompanying drawings.

BEST MODE FOR CARRYING OUT THE INVENTION

Figure 1:
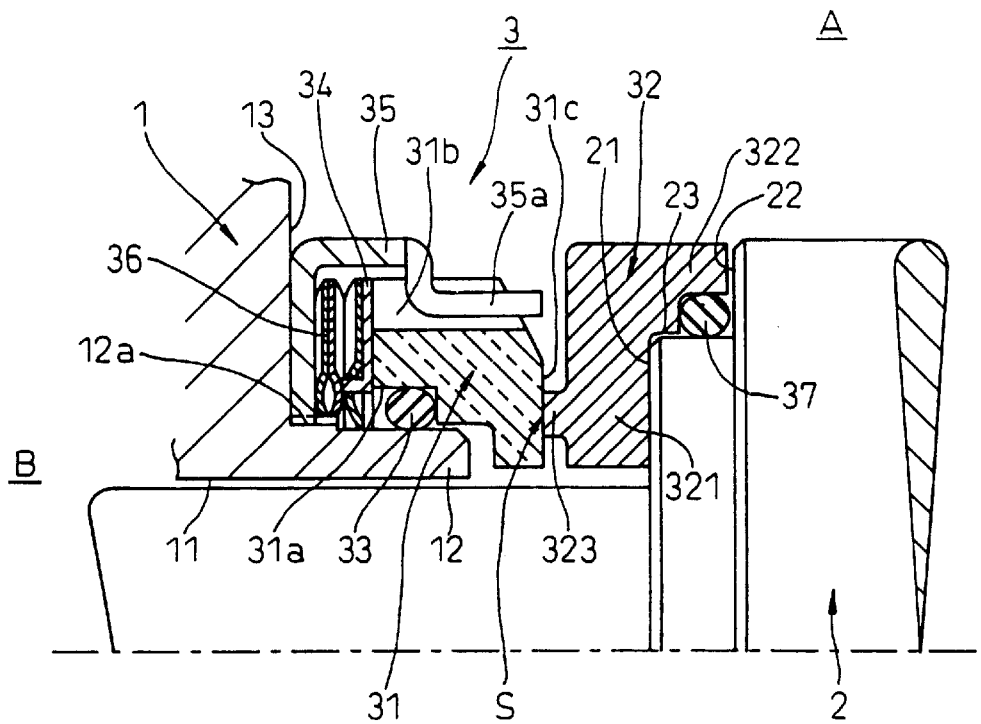
FIG. 1 is a cross-sectional view showing a half of a preferable embodiment of a shaft seal mechanism of a compressor with a mechanical seal of the present invention, wherein the view is taken on a plane passing through an axial center.

FIG. 1 is a view showing a preferable embodiment of a shaft seal mechanism of a compressor with a mechanical seal of the present invention. In the drawing, reference numeral 1 is a seal housing of a compressor of an air-conditioner for automobile use in which $CO_2$ is used as refrigerant. Reference numeral 2 is a rotary shaft which is inserted from an inner circumference of the shaft hole 11 of this seal housing 1 into the compressor and rotated when a drive force is given to it from a crank shaft of an engine via an electromagnetic clutch (not shown) so that the inner mechanism of the compressor can be driven. The mechanical seal 3 is arranged between the seal housing 1 and the rotary shaft 2.

In the mechanical seal 3, the stationary side sliding ring 31, which is attached to the seal housing 1 side in an unturnable state, and the rotary side sliding ring 32, which is attached to the rotary shaft 2 side and rotated integrally with this rotary shaft 2, are opposed to each other in the axial direction. The mechanical seal 3 exhibits a shaft seal function on the airtightly-sealed sliding face S on which end faces of the stationary side sliding ring 31 and the rotary side sliding ring 32 come closely into contact with each other. Spaces are formed around the shaft on both sides of the mechanical seal 3 in the axial direction. Space A, which exists on the right of the seal housing 1 and reaches the outer circumference of the airtightly sealed sliding face S in FIG. 1, is a space in the device to be sealed, and space B, which exists on the left of the seal housing 1 and reaches the inner circumference of the airtightly sealed sliding face S in FIG. 1, is an atmospheric side space open to the outside of the device.

The structure of the mechanical seal 3 will be explained in more detail as follows. The rotary side sliding ring 32 is made of carbon sliding material and arranged on the side of space A in the device when the rotary side sliding ring 32 is viewed from the stationary side sliding ring 31. This rotary side sliding ring 32 is fixed onto the outer circumferential face of the rotary shaft 2 via the O-ring 37. The rotary shaft 2 has an annular step section 21, 22 at a position where the rotary side sliding ring 32 is attached, and the diameter of the inserting section of this annular step section 21, 22, into the shaft hole 11 of the seal housing 1, is small. The rotary side sliding ring 32 includes: an inner circumference radial direction section 321, the back face of which comes into contact with the first annular step section 21 on the small diameter side; and an outer circumference axial direction section 322 which extends from the outer circumferential end section to the back face side and is held by the large diameter side outer circumferential face 23 of the first annular step section 21 via the O-ring 37. On the front face of the inner circumference diameter direction section 321, there is provided a sliding protrusion 323 which is continuously formed in the circumferential direction.

On the other hand, the stationary side sliding ring 31 is made of hard sliding material (for example, a ceramic such as SiC), the Young's modulus of which is higher than that of the carbon sliding material. On the outer circumferential face of the cylindrical support section 12 extending to the device side along the shaft hole 11 on the inner circumference of the seal housing 1, the stationary side sliding ring 31 is attached via the stationary side O-ring 33 in such a manner that the stationary side sliding ring 31 can be freely moved in the axial direction. When this stationary side O-ring 33 is accommodated in the packing accommodating recess 31a formed on the inner circumferential face on the back face of the stationary side sliding ring 31, the stationary side O-ring 33 is given an appropriate squeeze in the radial direction between the outer circumferential face of the cylindrical support section 12 and the stationary side sliding ring 31. On the back face (face on the opposite side to the rotary side sliding ring 32) of the stationary side sliding ring 31, the retainer 34 composed of a metal sheet is arranged, and the inner diameter section of the retainer 34 extends in such a manner that the rear of the packing accommodating recess 31a of the stationary side sliding ring 31 is closed.

On the back face side of the retainer 34, there is provided a case 35 composed of a flange-shaped metal sheet. This case 35 is engaged in the circumferential direction with the engaging section 12a formed on the outer circumferential face of the base portion of the cylindrical support section 12. At the same time, this case 35 is engaged in the axial direction with the end face 13 of the seal housing 1 rising from the rear end of the base portion. Between the retainer 34 and the case 35, there is provided a wave spring 36 which is appropriately compressed in the axial direction. In the outer circumferential section of the case 35, a plurality of engagement pawls 35a extending in the axial direction are arranged at regular intervals. These engagement pawls 35a are engaged with the engagement notches 31b formed on the outer circumferential face of the stationary side sliding ring 31 at the same phase intervals in such a manner that the engagement pawls 35a can be freely relatively moved in the axial direction.

In the above arrangement, the stationary side sliding ring 31 is attached to the seal housing 1 in such a manner that the stationary side sliding ring 31 cannot be rotated with respect to the seal housing 1 by the engaging section 12a of the cylindrical support section 12 and the case 35. A pushing force of the wave spring 36, in the axial direction, is given to the stationary side sliding ring 31 via the retainer 34. Therefore, the forward end face 31c of the stationary side sliding ring 31 is pressed against a forward end face of the sliding protrusion 323 of the rotary side sliding ring 32, which is rotated together with the rotary shaft 2, with an appropriate surface pressure, and an airtightly sealed sliding face S is formed. When the compressor is driven and the rotary shaft 2 is rotated, refrigerating machine oil is mixed as a mist with refrigerant $CO_2$ gas, which is compressed by the compressor at high pressure and temperature. A portion of the refrigerating machine oil mixed with the refrigerant $CO_2$ gas is introduced onto the airtightly sealed sliding face S and formed into a lubricant film, which excellently lubricates the airtightly sealed sliding face S and shuts off the refrigerant $CO_2$ gas so that it cannot leak to space B on the atmospheric side.

In this case, the pressure of the refrigerant $CO_2$ gas in space A in the device is higher than the atmospheric pressure in space B on the atmospheric side. Therefore, differential pressure between the atmospheric pressure and the pressure of the refrigerant $CO_2$ gas acting on the back face of the stationary side sliding ring 31 on the outer circumferential side of the airtightly sealed section by the stationary side O-ring 33, acts as a pressing load which increases surface pressure on the airtightly sealed sliding face S. However, concerning the positional relation in the radial direction of the stationary side O-ring 33 with the airtightly sealed sliding face S, most of the above pressing load is canceled by the differential pressure acting on the front face of the stationary side sliding ring 31 in the axial direction on the outer circumferential side of the airtightly sealed sliding face S by the sliding protrusion 323 of the rotary side sliding ring 32. Therefore, even when pressure of the refrigerant $CO_2$ gas in space A in the device fluctuates greatly, the surface pressure on the airtightly sealed sliding face S is not greatly changed.

Figure 2:
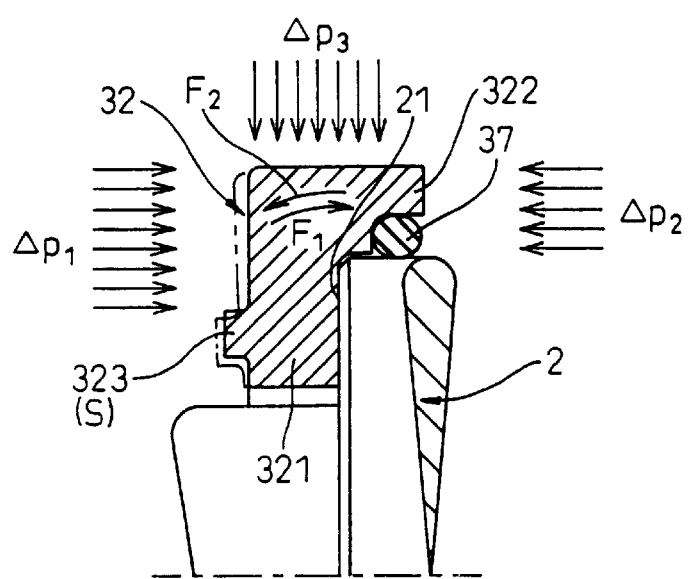
FIG. 2 is a schematic illustration showing an action conducted by the above embodiment.

On the other hand, concerning the rotary side sliding ring 32, the sliding protrusion 323, which forms the airtightly sealed sliding face S together with the stationary side sliding ring 31, is protruded from the inner circumferential radial direction section 321 and located on the inner diameter side with respect to the airtightly sealed section by the rotary side O-ring 37. Therefore, as shown in FIG. 2, a pressure receiving area of differential pressure $\Delta p_1$ acting on the front face of the rotary side sliding ring 32 in the axial direction on the outer circumferential side of the airtightly sealed sliding face S is larger than a pressure receiving area of differential pressure $\Delta p_2$ acting on the back face of the rotary side sliding ring 32 in the axial direction on the outer circumferential side of the section airtightly sealed by the rotary side O-ring 37. Accordingly, by the axial direction load $F_1$, caused by the difference between the pressure receiving areas, in this rotary side sliding ring 32, the back face of the inner circumferential radial direction section 321 is fixed being press-fit to the first annular step section 21 of the rotary shaft 2.

In a portion on the airtightly sealed sliding face S side with respect to the airtightly sealed section by the rotary side O-ring 37, differential pressure $\Delta p_3$ acting on the rotary side sliding ring 32 in the radial direction generates a deforming force $F_2$ by which the rotary side sliding ring 32 is made to lean against the stationary side sliding ring 31 side as shown by the two-dotted chain line in FIG. 2. However, the load $F_1$ in the axial direction described above acts in a direction so that the above deforming force $F_2$ can be canceled. Therefore, it is possible to prevent the rotary side sliding ring 32 from leaning in the direction of $F_2$. Due to the foregoing, it is possible to effectively prevent the occurrence of partial abrasion in which a quantity of abrasion on the airtightly sealed sliding face S (sliding protrusion 323) is increased on the outer circumferential side.

Figure 3:
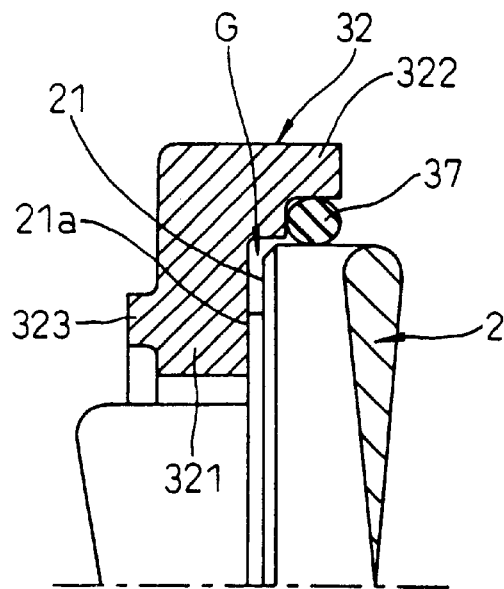
FIG. 3 is a cross-sectional view showing a half of a primary portion of a second preferable embodiment of a shaft seal mechanism of a compressor by a mechanical seal of the present invention, wherein the view is taken on a plane passing through an axial center.

Next, FIG. 3 is a view showing the second embodiment of the present invention. In this embodiment, in the first annular step section 21 on the rotary shaft 2, the auxiliary step section 21a, the outer diameter of which corresponds to the sliding protrusion 323 of the rotary side sliding ring 32, is formed. By this auxiliary step section 21a, in the outer circumferential section between the back face of the inner circumferential radial direction section 321 of the rotary side sliding ring 32 and the first annular step section 21, the axial direction gap G, which is located on the inner diameter side with respect to the airtightly sealed section by the rotary side O-ring 37, is formed. The structure of other portions is substantially the same as that shown in FIG. 1.

Figure 4:
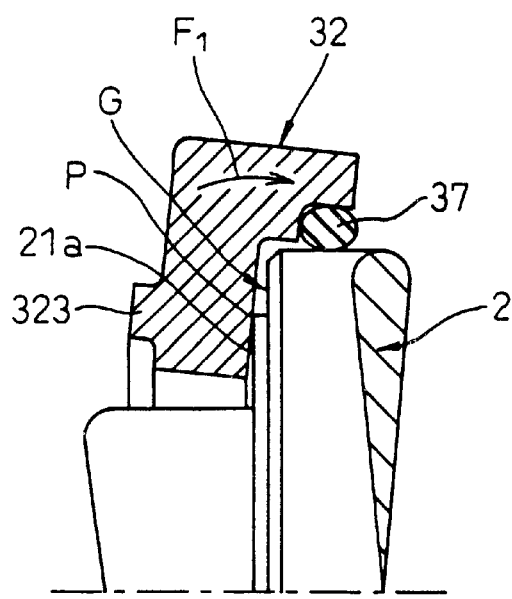
FIG. 4 is a schematic illustration showing an action conducted by the second embodiment described above.

According to the structure shown in FIG. 3, when the rotary side sliding ring 32 is given a deforming force $F_1$ caused by the difference between the pressure receiving area of differential pressure $\Delta p_1$ and the pressure receiving area of differential pressure $\Delta p_2$, the rotary side sliding ring 32 is deformed, as exaggeratedly shown in FIG. 4, while an outer diameter end of the auxiliary step section 21a is used as fulcrum P. By this deformation, the sliding protrusion 323 is lifted up at the outer circumferential side. Therefore, it is possible to positively prevent the occurrence of partial abrasion on the outer circumferential side of the sliding protrusion 323 which is caused when the sliding protrusion 323 leans as shown by the two-dotted chain line in FIG. 2.

In this connection, the following may be apparent in this structure. For example, when the deforming force $F_1$ is constant, the closer to the inner diameter side the fulcrum P of the auxiliary step section 21a is located, the more the quantity of deformation in the direction of $F_1$ is increased. On the contrary, the closer to the outer diameter side the fulcrum P of the auxiliary step section 21a is located, the less the quantity of deformation in the direction of $F_1$ is decreased. Accordingly, the inner diameter (outer diameter of the auxiliary step section 21a) of the gap G in the axial direction is set according to a state of use so that the airtightly sealed sliding face S can be put into an appropriate contact condition.

Figure 5:
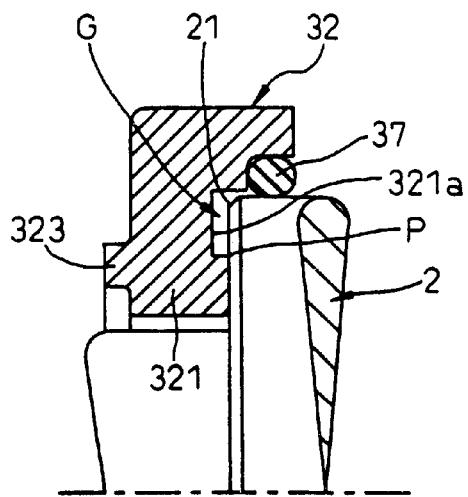
FIG. 5 is a cross-sectional view showing a half of a primary portion of a third preferable embodiment of a shaft seal mechanism of a compressor by a mechanical seal of the present invention, wherein the view is taken on a plane passing through an axial center.
Figure 6:
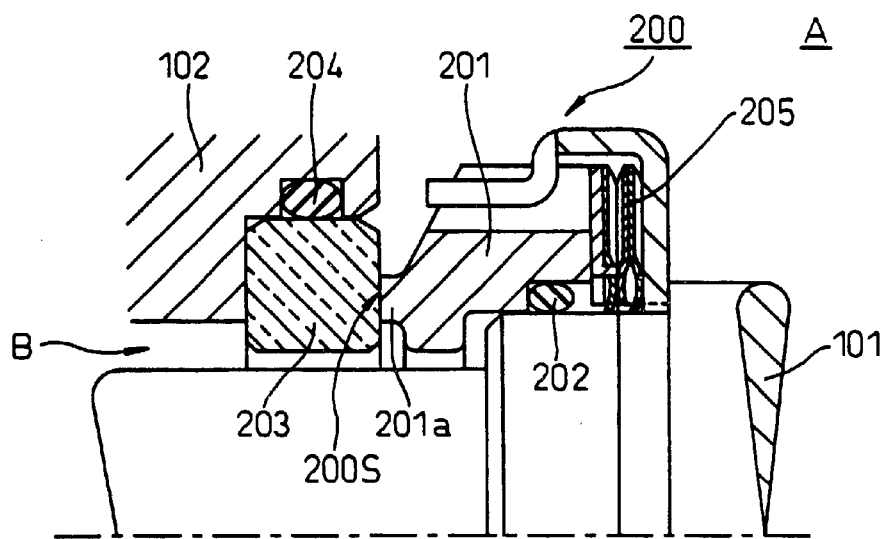
FIG. 6 is a cross-sectional view showing a half of a shaft seal mechanism of a compressor by a mechanical seal of the prior art, wherein the view is taken on a plane passing through an axial center.
Figure 7:
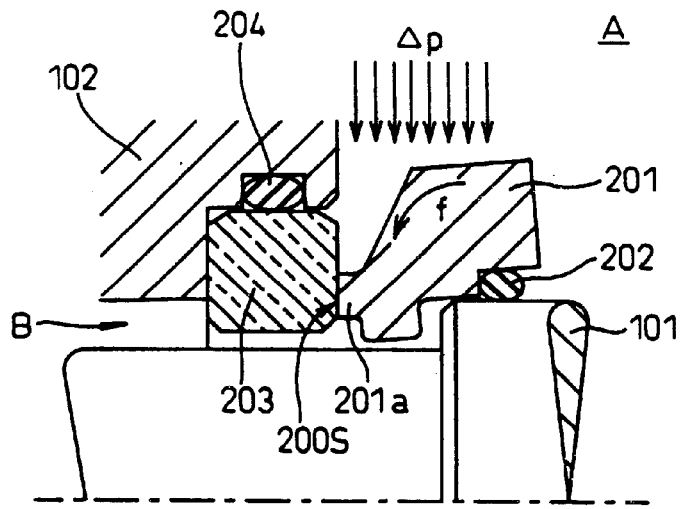
FIG. 7 is a schematic illustration showing a state of generation of partial abrasion in the prior art described above.
Figure 8:
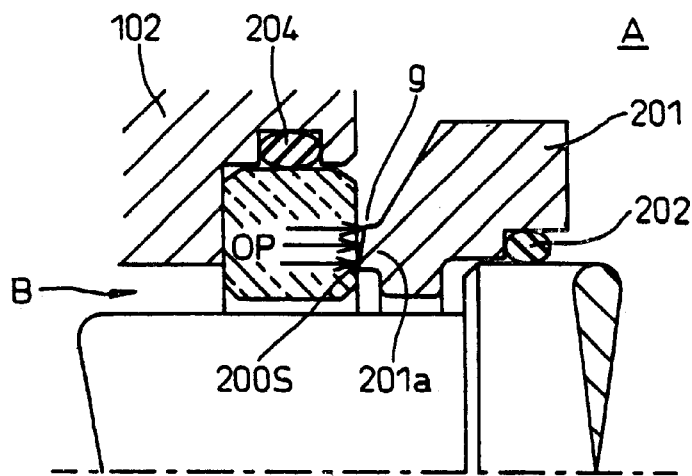
FIG. 8 is a schematic illustration showing a state of generation of a gap between sliding faces which is caused by partial abrasion in the prior art.

FIG. 5 is a view showing the third embodiment of the present invention. In this embodiment, in the outer circumferential section on the back face of the inner circumferential radial direction section 321 of the rotary side sliding ring 32, the clearance groove 321a is formed which is continuous in the circumferential direction. Due to the foregoing, in the outer circumferential section between the inner circumferential radial direction section 321 and the first annular step section 21 of the rotary shaft 2, the gap G, which is located on the inner diameter side with respect to the airtightly sealed section by the rotary side O-ring 37, is formed. The structure of other portions is substantially the same as that shown in FIG. 1.

In this case, when the rotary side sliding ring 32 is given a deforming force $F_1$ caused by the difference between the pressure receiving area of differential pressure $\Delta p_1$ and the pressure receiving area of differential pressure $\Delta p_2$, the rotary side sliding ring 32 is deformed while an inner diameter end section of the clearance groove 321a is used as fulcrum P. By this deformation, the sliding protrusion 323 is lifted up onto the outer circumferential side. Therefore, the same effect as that shown in FIG. 3 can be realized.

In this connection, in each embodiment described above, the rotary side sliding ring 32 is made of carbon sliding material, however, it is possible to use another self-lubrication sliding material such as PTFE or polyimide.

According to the shaft sealing mechanism of the compressor by the mechanical seal of the present invention, even if the refrigerant gas pressure in the device is increased to be high, it is possible to prevent the occurrence of partial abrasion on the outer circumferential side of the airtightly sealed sliding face caused by deformation when the rotary side sliding ring leans. Also, it is possible to prevent an increase in the sliding load caused by partial abrasion. Further, it is possible to effectively suppress an increase in the leakage of refrigerant gas.

In this connection, specific embodiments of the present invention are described in detail in this specification, however, it should be noted that variations may be made by one skilled in the art without departing from the spirit and scope of the present invention.

What is claimed is:

1. A shaft seal mechanism of a compressor with a mechanical seal, the mechanical seal comprising:
   a rotary side sliding ring supported by an outer circumferential face on a large diameter side of an annular step section formed on a rotary shaft of a compressor via a rotary side packing, the rotary side sliding ring being press-fit into the annular step section by gas pressure in the compressor; and
   a stationary side sliding ring, which is not rotated, airtightly fixed onto a seal housing side of the compressor via a stationary side packing in such a manner that the stationary side sliding ring can be moved in the axial direction, the stationary side sliding ring airtightly coming into contact with the rotary side sliding ring by a pushing force of a spring in the axial direction so as to form an airtightly sealed sliding face, wherein
      a space in the compressor, in which gas to be sealed exists, reaches an outer circumferential side of the airtightly sealed sliding face,
      the rotary side sliding ring is made of a self-lubrication sliding material,
      the stationary side sliding ring is made of a sliding material, the Young's modulus of which is higher than that of the self-lubrication sliding material, and
      a sliding protrusion extending from the rotary side sliding ring in the circumferential direction slidably comes into contact with the stationary side sliding ring.

2. A shaft seal mechanism of a compressor with a mechanical seal according to claim 1, wherein the self-lubrication sliding material is a carbon sliding material, a PTFE sliding material or a polyimide sliding material.

3. A shaft seal mechanism of a compressor by a mechanical seal according to claim 1, wherein a gap in the axial direction is formed in an outer circumferential section between an annular step section of the rotary shaft and a back face of an inner diameter section of the rotary side sliding ring, which are contacted with each other, being located on the inner diameter side with respect to an airtightly sealed section formed by the rotary side packing.

* * * * *